Figure 1:
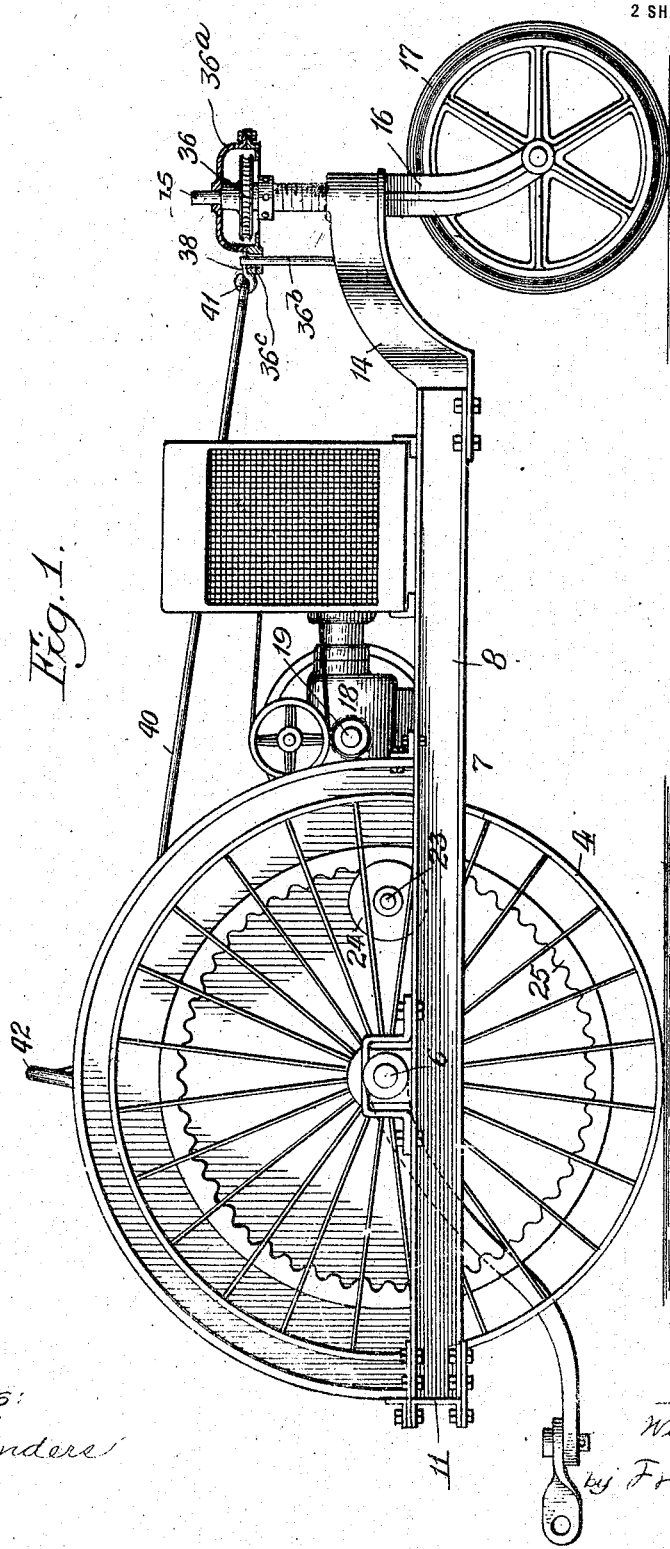

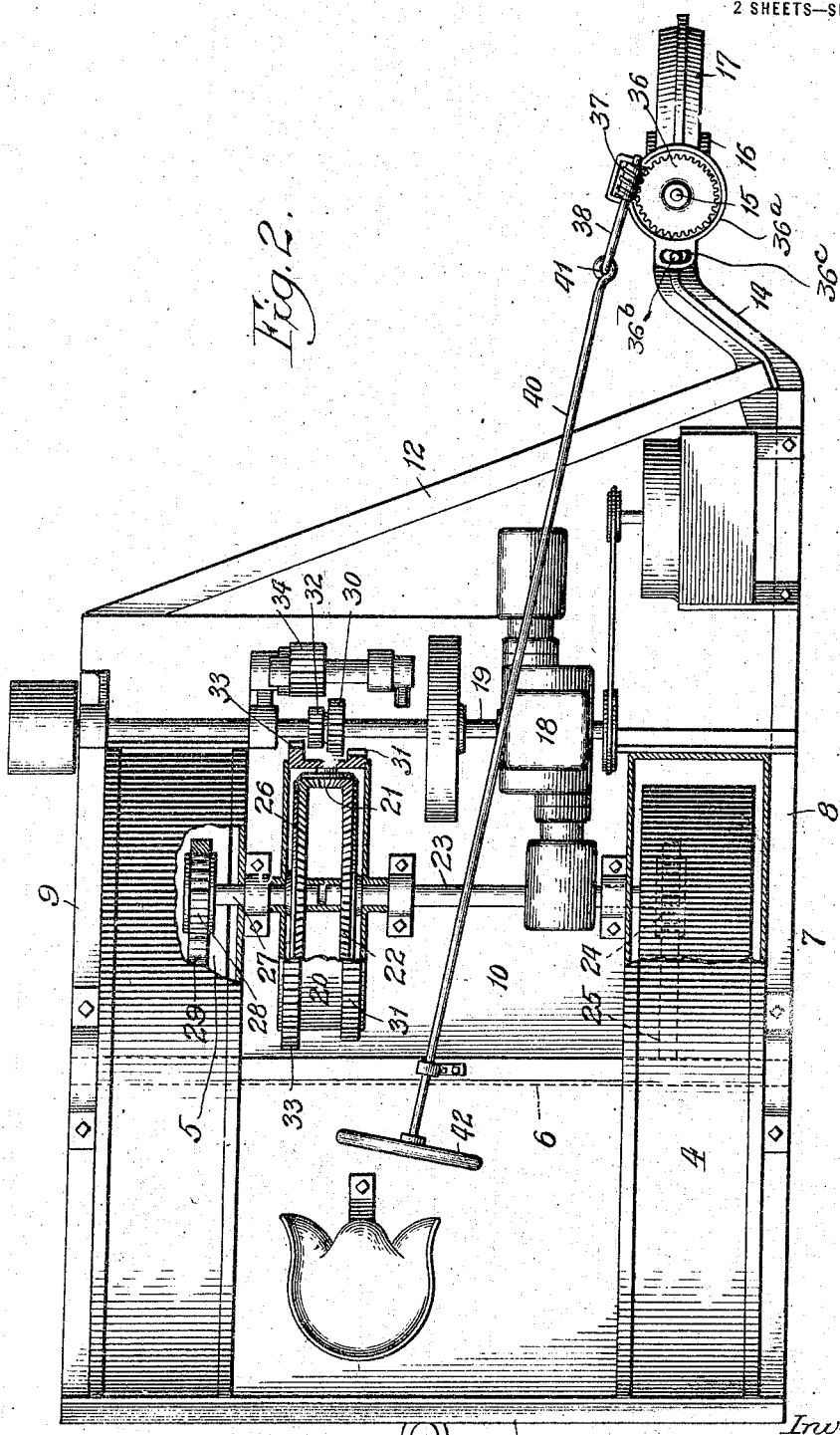

UNITED STATES PATENT OFFICE.

WILLIAM L. GILE, OF LUDINGTON, MICHIGAN, ASSIGNOR TO JUSTUS S. STEARNS, OF LUDINGTON, MICHIGAN.

PLOW-TRACTOR.

1,193,776.   Specification of Letters Patent.   Patented Aug. 8, 1916.

Application filed March 22, 1916. Serial No. 85,874.

*To all whom it may concern:*

Be it known that I, WILLIAM L. GILE, a citizen of the United States, and a resident of Ludington, in the county of Mason and State of Michigan, have invented certain new and useful Improvements in Plow-Tractors, of which the following is a full, clear, and exact description.

The invention relates to plow tractors.

In practice, considerable difficulty has been experienced in guiding or steering a plow tractor and this, necessitated almost constant manipulation of the steering wheel by the operator, in order to keep the tractor traveling in line with a previously cut furrow, so that the plows behind the tractor would be pulled along the proper course with respect to the plowed land.

I have discovered that a plow tractor comprising a pair of coaxial traction wheels driven through a differential gearing which permits the wheels to travel at different relative speeds may be controlled automatically by a front furrow wheel mounted in longitudinal alinement with the traction wheel at the furrow side of the tractor and that this front furrow wheel, even when locked against lateral swinging, will control the direction of travel of the tractor responsively to the furrow, so that the operator need give little or no attention to the steering of the tractor after the first furrow has been cut. This automatic control suffices even to cause the tractor to turn a corner with the corner of a furrow. This results in relieving the operator of considerable work and also effects a very material saving in power, because of the regularity with which the tractor will follow the furrow, as a result of the automatic control.

The object of the invention is to provide an improved plow tractor in which the parts are constructed and properly disposed and balanced to permit the front carrying wheel, when traveling in a furrow, to automatically steer the tractor.

The invention consists in the several novel features hereinafter set forth and more particularly defined by claims at the conclusion hereof.

In the drawings; Figure 1 is a side elevation of a tractor embodying the invention. Fig. 2 is a plan, parts being shown in section.

The tractor comprises a pair of traction wheels 4 and 5 coaxially mounted on an axle 6; a suitable supporting frame 7 comprising sills 8 and 9, a plow-frame 10, a back-bar 11 and a front cross bar 12. The front of this frame has secured thereto a member 14 in which is journaled the standard 15 of a fork 16 in which the front furrow wheel 17 is mounted.

A motor 18 of any suitable construction is adapted to drive the transverse shaft 19. The driving mechanism between the traction wheels and the shaft 19 comprises differential gearing of suitable construction which permits the traction wheels to travel at different relative speeds in traveling over the ground. The exemplification of this differential gearing shown in the drawing comprises a ring or drum 20 on which are internally mounted beveled pinions 21. These pinions at one side mesh with a gear 22 on a shaft 23 to which is secured a pinion 24 meshing with an internal gear 25 on the traction wheel 4. At the other side, pinions 21 mesh with a gear 26 on a shaft 27, to which is fixed a pinion 28 for driving the internally toothed gear or rack 29 on the traction wheel 5. Variable speed and reversible driving mechanism is usually provided between shaft 19 and the drum 20. This mechanism comprises a slidable high speed pinion 30 adapted to mesh with a gear 31 on the outside of drum 20, a low-speed pinion 32 movable into engagement with a gear 33 on the outside of drum 20 and a reversing gear 34. It will be understood that any suitable variable speed and reversible driving mechanism may be employed.

A gear wheel 36 is fixed to the upper end of the standard 15 and a worm wheel 37 on a short shaft 38 meshes with said gear. Shaft 38 is journaled in a housing 36ª mounted on the upper end of standard 15. A rod 40 pivotally connected to shaft 38 at 41 extends rearwardly and is provided with a steering wheel 42 at its rear end. By turning the steering wheel 42, worm 37 will operate gear 36 and standard 15 to turn the front furrow wheel 17 laterally to steer the vehicle on the road, or if desired to angle the furrow wheel slightly relatively to the traction wheels to cause the front wheel to crowd toward or away from land according to the character of the plowed soil over which the tractor is operated. Housing 36ª is held by a post 36ᵇ on frame-members 14, being provided with a slot 36ᶜ which presents a limited turning of the front wheel without manual operation of the steering wheel. The limited freedom of movement causes the front wheel to respond more readily to irregularities in the furrow. Steering rod 40 and steering wheel 42 are supported upon the frame so they may move longitudinally to permit movement of gear 36, worm-wheel 37 and housing 36ª within the limit permitted by stud 36ᵇ and slot 36ᶜ.

The hitch between the tractor and the plow being pulled is placed at the proper level to avoid any tendency to lift the front wheel out of the furrow, and the weight of the several parts is distributed so it will be applied mostly to the traction wheels, leaving sufficient weight upon the front wheel to cause it to ride on the ground and automatically guide the tractor, but without excessive pressure.

The weight of the several parts of the tractor is distributed as exemplified in the structure shown in the drawings so as to cause both of the traction wheels 4 and 5 to provide the proper or substantially equal tractive effect so that when one of said wheels is traveling in the furrow and the other upon unplowed land, the tractor will travel forwardly under the influence of the furrow and steering wheel 17. In attaining this result, both of the traction wheels 4 and 5 will be driven from the motor through differential gearing which permits the traction wheels to be driven differentially in response to the automatic control caused by the front furrow wheel.

In plowing, after one furrow has been cut around the field, the tractor will be operated with the front wheel 17 and the traction wheel 14 both traveling in the last furrow cut and the traction wheel 5 will travel upon land. With the steering wheel 17 locked against rotation, the furrow will guide the wheel, and by reason of the differential gearing between the two traction wheels, the furrow will hold the front wheel 17 in its course and with sufficient force to cause it to control the operation of the differential gearing, so that the traction wheel 5 traveling on unplowed land will compensate for any irregularity in the furrow or in turning the corner of the furrow. As a result, the invention exemplifies a plow tractor, in which a single front furrow wheel traveling ahead of one of the traction wheels in a furrow will automatically steer the tractor to cause it to travel in line with the previously cut furrow. When the tractor is not traveling with one side in a furrow, the steering mechanism may be used to laterally swing the front wheel 17 to control the direction of travel of the tractor.

The invention is not to be understood as restricted to the details set forth, since these may be modified within the scope of the appended claims, without departing from the spirit and scope of the invention.

Having thus described the invention, what I claim as new and desire to secure by Letters Patent, is:—

1. In a plow tractor, the combination of a pair of co-axial traction wheels at the sides of the tractor respectively, a single front steering wheel substantially alined longitudinally with one of the traction wheels, said longitudinally alined steering and traction wheels being disposed at the furrow side of the tractor and adapted to travel in the same furrow, a frame supported by said traction and steering wheels, differential gearing between the traction wheels and whereby both will be driven, and a motor mounted on the frame and connected to drive said gearing, said single front wheel when traveling in a furrow acting to automatically steer the tractor, said gearing causing the traction wheels to be driven at relatively different speeds in steering the tractor responsively to the front furrow wheel.

2. In a plow tractor, the combination of a pair of coaxial traction wheels at the sides of the tractor respectively, a single front steering wheel substantially alined longitudinally with one of the traction wheels, said longitudinally alined steering and traction wheels being disposed at the furrow side of the tractor, and adapted to travel in the same furrow, a frame supported by said traction and steering wheels, differential gearing between the traction wheels and whereby both will be driven, a motor mounted on the frame and connected to drive said gearing, said single front wheel when traveling in a furrow acting to automatically steer the tractor, said gearing causing the traction wheels to be driven at relatively different speeds in steering the tractor responsively to the front furrow wheel, and means for limiting the lateral turning of the steering wheel.

3. In a plow tractor, the combination of a pair of co-axial traction wheels at the sides of the tractor respectively, a single front steering wheel substantially alined longitudinally with one of the traction wheels, said longitudinally alined steering and traction wheels being disposed at the furrow side of the tractor and adapted to travel in the same furrow, a frame supported by said traction and steering wheels, differential gearing between the traction wheels and whereby both will be driven, a motor mounted on the frame and connected to drive said gearing, said single front wheel when traveling in a furrow acting to automatically steer the tractor, said gearing causing the traction wheels to be driven at relatively different speeds in steering the tractor responsively to the front furrow wheel, a lost motion connection for permitting limited lateral turning of said steering wheel, and mechanism for adjusting and turning the steering wheel.

WILLIAM L. GILE.